United States Patent [19]
Marsh, Jr.

[11] 3,804,439
[45] Apr. 16, 1974

[54] PIPE COUPLING

[76] Inventor: Richard O. Marsh, Jr., 701 Standard Life Building, Edgeworth Borough, Allegheny County, Pa. 15222

[22] Filed: Aug. 7, 1972

[21] Appl. No.: 278,549

[52] U.S. Cl. ............................................. 285/113
[51] Int. Cl. ............................................. F16l 17/00
[58] Field of Search ............ 285/113, 37, 104, 105, 285/308; 277/235

[56] References Cited
UNITED STATES PATENTS

| | | | |
|---|---|---|---|
| 2,226,304 | 12/1940 | Dillon | 285/105 |
| 3,179,445 | 4/1965 | Moretti | 285/113 |
| 2,914,345 | 11/1959 | Oborn | 285/113 |
| 2,660,491 | 11/1953 | Sundholm | 277/235 |
| 2,127,086 | 8/1938 | McGrath | 285/105 |
| 865,497 | 9/1907 | Kenyon | 285/113 |
| 2,508,914 | 5/1950 | Graham | 285/105 |

Primary Examiner—Reinaldo P. Machado
Attorney, Agent, or Firm—Buell, Blenko & Ziesenheim

[57] ABSTRACT

The specification discloses a threadless pipe coupling for sealingly connecting the adjacent ends of two co-axially juxtaposed pipe sections. The coupling comprises a sleeve element having its wall formed with annular grooves adjacent opposite ends and with annular gaskets disposed in the grooves and surrounding the corresponding pipe section. A sleeve-like extension of each gasket projects axially out of the open end of the coupling sleeve element by which to pull the gasket axially by hand into wedging sealing relation between the pipe and the conical wall of the groove in the sleeve element or reversely to disengage the gasket from sealing engagement with the sleeve and pipe. A helical band at each end of the sleeve element actuated by rotation of a thrust ring may be alternatively used to effect pulling motion of the gaskets.

5 Claims, 5 Drawing Figures

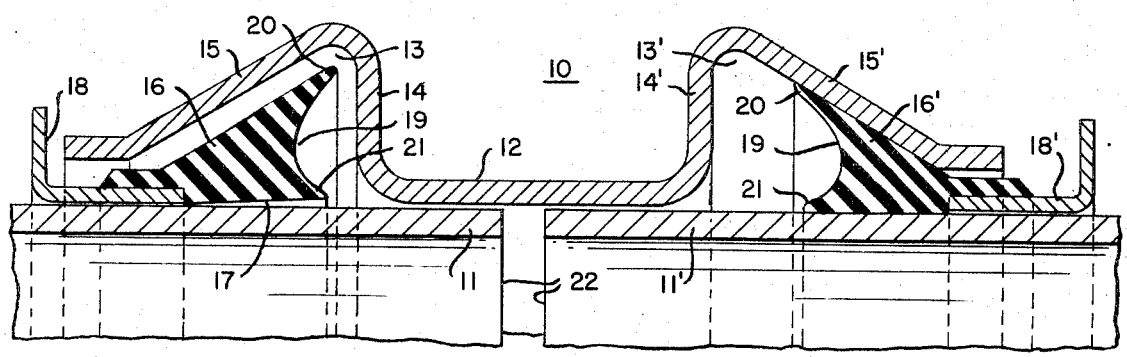
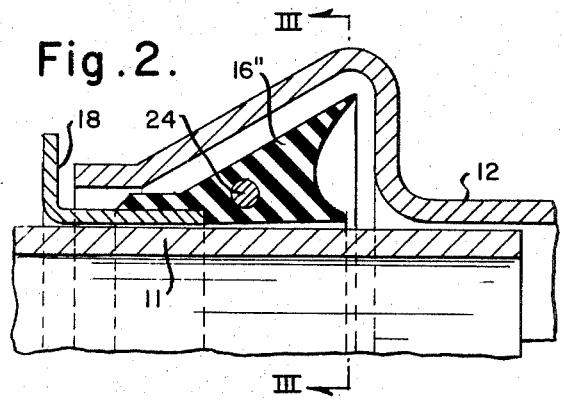
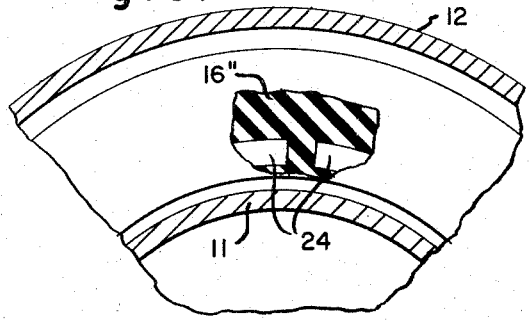
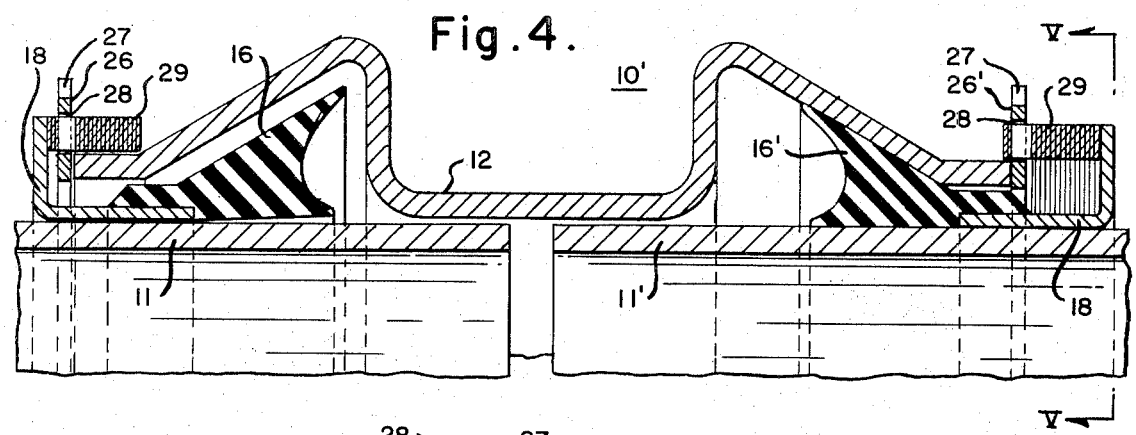
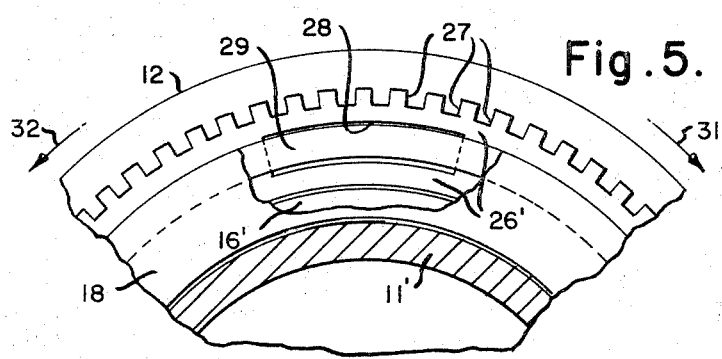

PIPE COUPLING

This invention relates to pipe couplings of the threadless type for sealingly joining coaxially juxtaposed sections of pipe, particularly pipe of relatively large diameter such as is commonly used in pipelines for water, gas, and the like.

It is common present-day practice in laying pipelines to join adjacent pipe sections on the job site by welding together the juxtaposed ends of coaxially laid pipe sections. This operation requires skilled personnel and a careful checking of the welds to assure leak-proof joints. Various nonwelded seals have been proposed and employed but have proven undependable and subject to drawbacks of complexity and the like.

In order to avoid the difficulties and disadvantages of earlier pipe couplings and of welding large diameter pipe in the field, and at the same time, enable employment of relatively unskilled personnel, I previously devised a variety of coupling devices of novel construction capable of installation in the field by relatively unskilled personnel. Such coupling devices have been disclosed and claimed in my previous application, Ser. No. 163,911, filed July 19, 1971.

It is the purpose of my present invention to provide a pipe coupling which is a variation from the pipe coupling devices disclosed in my foregoing application and which has certain advantages over the forms of coupling devices there disclosed, especially with regard to utilizing the pressure of the liquid or gas flowing in a pipeline to assist in applying the coupling with a tighter seal.

The presently preferred form of coupling herein disclosed fulfills the requirements for a coupling for temporary pipelines, namely one that is simple in construction, inexpensive to make, easy to install and remove, and has particular application and use in laying temporary pipelines for various industries, such as mining, dredging, construction, ventilation, irrigation and others.

The presently preferred form of coupling which I provide comprises an essentially cylindrical sleeve element into which the ends of two coaxially juxtaposed pipe sections telescopically extend. The wall of the sleeve element is formed adjacent each end to provide an annular groove that conically tapers toward the end of the sleeve element, and an annular gasket having a conical surface conforming to that of the wall of the groove is disposed in each groove. A sleeve-like extension of the gasket which projects end-wise out of the sleeve element serves to pull the gasket axially into wedging sealed relation with the pipe section. Reverse motion of the gasket, as by tapping the gasket extension with a hammer, serves to break the seal of the gasket with the pipe section for uncoupling purposes. Reinforcement for the gasket may optionally be provided in the form of a segmented ring of rod-like cross-section which prevents extrusion of the gasket end-wise between the pipe and sleeve element under high pressure conditions. The disposition of the grooves in the sleeve element and of the gasket is such that the pressure of the liquid or gas flowing through the pipeline serves to assist in maintaining the seal of the gaskets between the pipe sections and the sleeve element.

I also provide an alternative form of coupling in which the rotation of a thrust ring transfers turns of a spiral band axially through a radial slot in the thrust ring to exert an axial moving force on the gasket extension for coupling purposes.

More specific details and advantages of the presently preferred form of coupling device constituting the present invention will be described hereinafter in connection with the accompanying drawings, wherein:

FIG. 1 is a fragmental longitudinal cross-sectional view, showing one form of coupling, illustratively shown in coupled and uncoupled positions at opposite ends thereof;

FIG. 2 is a fragmental longitudinal cross-sectional view through one end of the coupling of FIG. 1, showing a variation including a reinforcement for the annular gasket;

FIG. 3 is a transverse sectional view, taken substantially on the line III-III of FIG. 2;

FIG. 4 is a fragmental longitudinal cross-sectional view, showing a variation of the form of coupling in FIG. 1, in which rotation of a thrust ring at each end of the coupling sleeve serves to couple the pipe sections; and FIG. 5 is a fragmental transverse sectional view, taken substantially on the line V—V of FIG. 4.

Referring to FIG. 1, the embodiment of coupling 10 shown therein is illustratively shown in connection with two coaxially juxtaposed pipe sections 11 and 11', the coupling being represented in sealed coupling relation to pipe section 11', and in unsealed uncoupled relation to the pipe section 11.

Coupling 10 comprises a generally cylindrical sleeve element 12, the wall of which is formed or shaped adjacent opposite ends so as to provide annular grooves 13 and 13', one wall 14,14' of which is essentially radial and the intersecting wall 15,15' of which is conically sloped toward the end of the sleeve element. The central portion of sleeve element 12 conforms closely in diameter to the outer diameter of the pipe sections 11,11', whereas the end portions of the sleeve element 12 are substantially larger in diameter than the pipe sections 11,11' for a purpose later made apparent.

Disposed in the annular grooves 13,13' are annular gaskets 16,16', the gaskets being identical in construction but reversed in position. Essentially, the annular gaskets 16 and 16' comprise a body portion of rubber or rubber composition, formed in conical shape and having a central circular hole 17 therein through which the pipe section 11 or 11' extends.

Bonded to or formed integrally with the body portion of the gaskets is a sleeve-like extension 18, which may be made of metal or hard rubber composition. The extension 18 conforms closely to the outer diameter of the pipe sections 11,11' and at the outer end has a radial flange by which to manually grasp or apply axial moving force to the gaskets 16 or 16'.

It should be noted that the slope of the outer conical surface of the gaskets 16,16' is somewhat greater than that of the cooperating inner surface of the walls 15,15' of the groove 13,13'. Likewise, the central hole 17 flares gradually to a slightly larger diameter at the inner end thereof than the inner diameter of the sleeve extension 18. The inner face of the annular gaskets 16,16' is formed with an annular concave recess 19, thus providing flexibility in the outer and inner annular lips 20 and 21 of the body of the gasket.

The diameter of the body portion of the annular gaskets 16,16', in their free state, is larger than the internal diameter of the ends of sleeve element 12. Consequently, the body portion of the gaskets must be of sufficient flexibility to permit manual deformation of the body portion requisite for axial entry through the end openings of the sleeve element 12. Accordingly, once they are inserted through the end openings of the sleeve element 12, the gaskets 16,16' become interlocked within their corresponding annular grooves 13 and 13'.

The operation of installing the coupling 10 is a relatively simple procedure. One end of the coupling is first slipped telescopically over the end of one of the pipe sections for example, pipe section 11, sufficiently that the opposite end of the coupling does not project beyond the end of the pipe section. The end of pipe section 11' is now brought into close coaxial alignment with pipe section 11 and the coupling is then returned axially in telescopic relation over the end of the juxtaposed pipe section 11' such that the center of the coupling registers substantially with the crevice 22 between the juxtaposed ends of the pipe sections 11 and 11'. In the drawing, the crevice 22 is shown of exaggerated width for clarity. Actually, some spacing between the ends of the pipe sections 11 and 11' is preferred to allow for thermal expansion of the pipe sections without buckling.

From the position illustrated by gasket 16, the gaskets are consecutively pulled toward their respective ends of the sleeve element 12 by manually grasping the end flange of extension 18 of the gasket until the body of the gasket is wedged in sealing relation between the inner conical wall surface of groove 13,13' and the outer surface of pipe section 11,11'. The latter position is represented by gasket 16' in the drawing. It will be seen that the greater slope of the conical body of the gasket relative to that of the conical wall of the recesses insures compression of the body of the gasket as it becomes wedged, the concave recess 19 enabling flexure of the lips 20 and 21.

If necessary, the gaskets may be forcibly applied into sealing position by gently tapping the end flanges of the extensions 18 outwardly, as with a hammer or equivalent object.

It is to be noted that due to the direction of the slope of the conical wall 15,15' of the sleeve element 12, the pressure of the liquid, gas or other element flowing through the pipeline including pipe sections 11 and 11', acts on the inner face of the gaskets over the surface of concave recess 19 to enhance the seal of the pipe sections.

In order to uncouple the pipe sections 11 and 11', all that is necessary is to manually push on the end flanges of the extensions 18 of the gaskets or to tap lightly thereon with a hammer to break the wedging seal of the gasket on the sleeve element 12 and the pipe sections. By reverse procedure, the coupling 10 may now be shifted axially until entirely supported on one pipe section, and the pipe sections 11 and 11' then separated following which the coupling 10 may be axially slid off the end of the pipe section.

FIGS. 2 and 3 show a modification of the coupling device 10, in which a gasket 16" is provided having a circumferential reinforcement. For this purpose a rodlike ring 24 is embedded in the body of the gasket. The reinforcing ring 24 is preferably split or segmented, as shown in FIG. 3, in order to enable collapse of the gasket body sufficiently to install through the smaller diameter ends of sleeve element 12.

The gasket 16" is desirably employed in couplings which are used in pipelines containing liquids or gases under very high pressure. It will be seen that the reinforcing ring or segments 24 resist extrusion of the gasket body through the annular space intervening between the pipe section and the inner diameter of the end of sleeve element 12.

The embodiments of pipe couplings thus far described are designed primarily for temporary application, for the reason that if subject to extreme variations in temperature, the continual expansion and contraction of the pipe sections under a low-pressure condition in the pipeline may cause unsealing of the gaskets and possible temporary leakage, until such time as the internal pipeline pressure increases sufficiently to seat the gaskets or the gaskets are pulled tight from the outside.

A modified form of coupling 10' is shown in FIGS. 4 and 5 which is appropriate and suited for permanent pipeline installations. As apparent from the drawings, coupling 10' is identical to coupling 10 except for the addition at each end of the sleeve 12 of a thrust ring 26,26' and a helical band 29. Thrust rings 26,26' are provided along their outer circumferential periphery with a succession of notches or recesses 27, the purpose of which is to provide means for manually or otherwise grasping them to effect rotation thereof on an axis coincident with the longitudinal axis of the pipe sections 11 and 11'.

Each thrust ring 26,26' has a radial slot 28 cut or formed therein, through which extends the portion of one turn of a helical band 29 which connects respective turns of the band on one side of the thrust ring 26,26' and those on the other side. The end turn of each of the bands 29 is secured, as by welding, to the radial flange of the extension 18 on each gasket 16,16'. It should be understood that, in principle, the use of the helical band is disclosed and described in connection with one of the embodiments in my aforementioned prior copending application, Ser. No. 163,911.

Except as modified in the manner just described, the embodiment of coupling shown in FIGS. 4 and 5 is substantially identical to that in FIG. 1. Repetitious description of the gaskets 16,16' and sleeve element 12 is thus deemed unnecessary and corresponding parts in the FIGS. 1 and 4 are identified by the same reference numerals.

In operation, the coupling 10' is placed in position overlapping the ends of pipe sections 11,11' as described before for the embodiment of coupling shown in FIG. 1.

In order to move the gaskets 16,16' in coupling 10' outwardly to effect a seal on the pipe sections 11,11', the thrust ring elements 26,26' are separately rotated manually or with a wrench on their longitudinal axis coaxially to the pipe sections in a clockwise direction, indicated in FIG. 5 by the arrow 31, to increase the number of turns of band 29 between the thrust rings 26,26' and the corresponding radial flanges on the extensions 18 of the gaskets 16,16'. In consequence, each of the gaskets 16,16' is shifted from the position represented by the gasket 16 in FIG. 4 to the position represented by the gasket 16' in FIG. 4, in the latter of which a seal is effected on the pipe sections 11,11'.

Uncoupling of the pipe sections 11,11' in FIG. 4 may be effected by separate reverse rotation of the thrust rings 26,26' in the counterclockwise direction, as indicated by the arrow 32 in FIG. 5. With such rotation of the thrust rings 26,26', the number of turns of each band 29 between the thrust rings 26,26' and the flanges of the extensions 18 on the gaskets 16,16' is decreased to the number represented at the left-hand end of the sleeve element 12, in FIG. 4. The gaskets 16,16' are then moved inwardly to break the seal of the gaskets on the respective pipe sections by manually pushing or tapping with a hammer on the flange of the extension 18. The coupling 10' may then be removed from the pipe sections in the same manner, previously described for removal of the coupling 10.

The embodiment of coupling 10' is better suited than coupling 10 for permanent pipeline installation, inasmuch as thermal expansion and contraction of the pipe section with low-pressure transmission of liquids or gases in the pipeline is not effective to lessen the seal of the gaskets and cause leakage from the pipeline.

While specific embodiments of the invention are here shown and described, it will be apparent that variations therein may be made within the scope of the appended claims.

I claim:

1. A pipe coupling device for coupling two coaxially juxtaposed pipe sections, comprising a generally cylindrical sleeve element formed internally with an annular recess adjacent each of the opposite ends thereof, one wall of each recess sloping conically toward the end of the sleeve element and terminating in an annular configuration substantially larger in diameter than that of the pipe sections to be coupled, and an annular gasket element disposed in each of said annular recesses and having a conically shaped body substantially conforming to the slope of the said one wall of the recess, and a central hole the diameter of which is larger than the outer diameter of a pipe section adapted to be inserted therethrough, and a rigid one-piece member secured to each of said gasket elements and extending through the annular space between the sleeve element and the pipe section therein to the outside of the sleeve element, by which to pull the gasket element axially to a position in which it seals on the said one wall of the recess and the outer surface of a pipe section extending therethrough or reversely to push the gasket element to an unsealing position.

2. A pipe coupling device according to claim 1, wherein each of said members comprises a cylindrical sleeve portion the inner end of which is attached to a corresponding gasket element and the outer end of which extends exteriorly of said sleeve element and has a radial flange thereon to which a force may be applied to move the gasket element within the recess to a position sealed on the said sloping wall and on the outer surface of a pipe section extending through the central hole thereof.

3. A pipe coupling according to claim 1, wherein the central hole of each gasket element tapers in diameter toward the outer end thereof.

4. A pipe coupling according to claim 1, wherein the body of each of said gasket elements has embedded therein circumferentially spaced rigid arcuate segments of a metallic ring to prevent outward extrusion of the gasket element while permitting sufficient collapse of the body for installation in the corresponding said annular recess in said sleeve element.

5. A pipe coupling according to claim 2, wherein an annular thrust ring element is disposed in surrounding relation to the sleeve portion of each of said members, each thrust ring element having a radial slot therein, and wherein a helical band element disposed in coaxial relation to said sleeve element has the outer end turn secured to the radial flange of the gasket moving member and is connected through the radial slot in the corresponding said thrust ring element to the remaining turns of the helical band, whereby rotation of said thrust ring elements separately on the longitudinal axis thereof causes an increase in the number of turns of said helical band between the thrust ring element and the corresponding radial flange on the sleeve portion of each of said members, resulting in axial movement of the gasket elements into sealing position with said sleeve element and a corresponding pipe section.

* * * * *